Nov. 21, 1944.　　　W. L. SAVELL　　　2,363,150
CHEMICAL MANUFACTURE
Filed Oct. 9, 1941
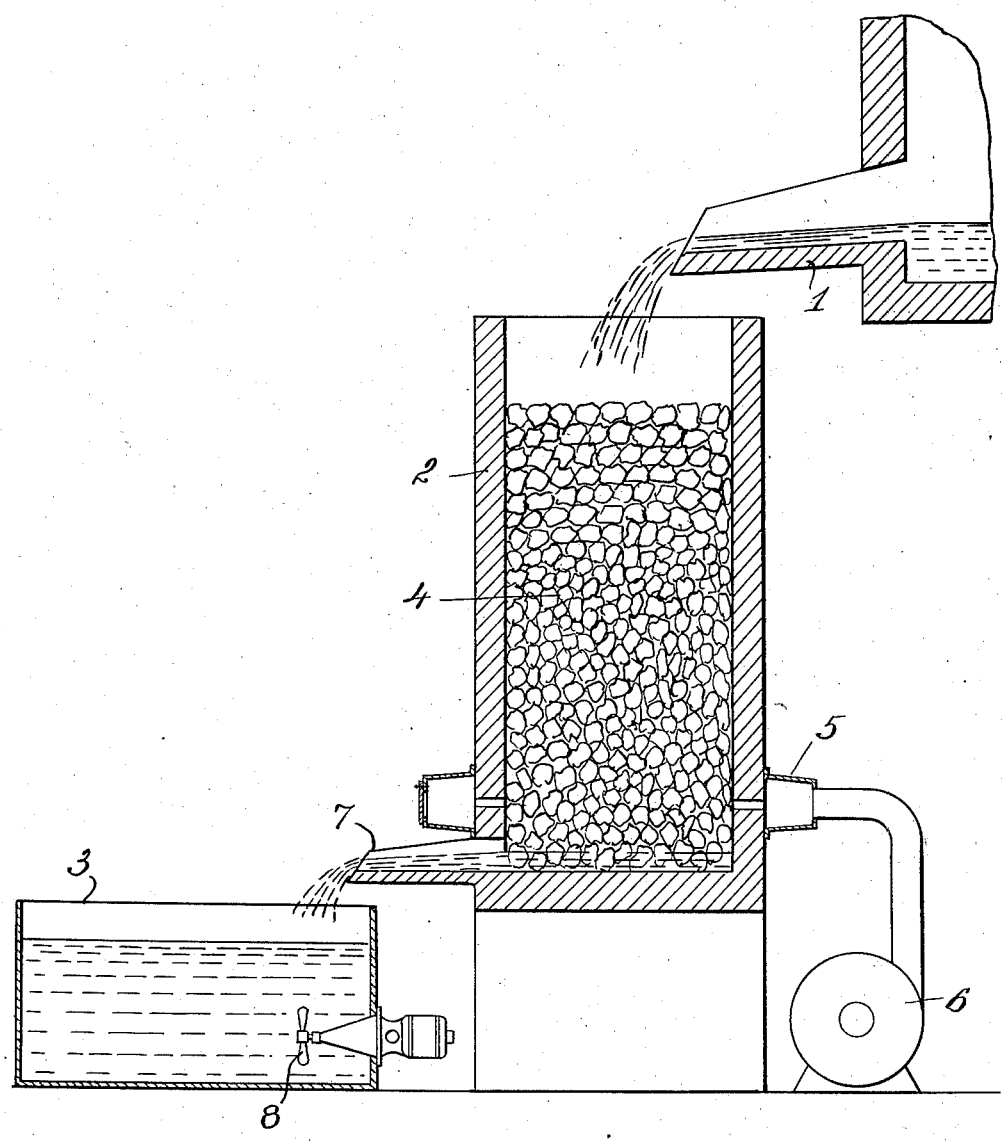
INVENTOR
Walter L. Savell
BY
Pennie Davis, Marvin & Edmonds
ATTORNEYS Patented Nov. 21, 1944

2,363,150

UNITED STATES PATENT OFFICE 2,363,150

CHEMICAL MANUFACTURE

Walter Lee Savell, Forest Hills, N. Y., assignor to The Mathieson Alkali Works, Inc., New York, N. Y., a corporation of Virginia Application October 9, 1941, Serial No. 414,290

4 Claims. (Cl. 252—183)

This invention relates to improvements in the regeneration of sodium hydroxide—sodium sulfide cooking liquors for the production of wood pulp by the Kraft or so-called sulfate process. Following the cooking operation, in which wood is pulped by the cooking liquor, the spent liquor is drained and washed from the pulp mass and processed for recovery of sodium hydroxide and sodium sulfide. As separated from the pulp, the spent liquor is known as "black liquor." This black liquor contains any unconsumed sodium hydroxide and sodium sulfide, compounds formed by reaction of these pulping agents with organic constituents of the wood and other organic material extracted from the wood during cooking. In the conventional recovery operation, this black liquor is dehydrated to form a dehydrated residue known as "black ash" containing a substantial proportion of organic material, this dehydrated residue is carbonized and burned to eliminate the organic matter and to regenerate the inorganic salts potentially present, and the inorganic residue is fused to produce a molten salt mixture consisting chiefly of sodium carbonate and sodium sulfide. This salt mixture is dissolved in water to form a solution known as "green liquor." This green liquor is causticized with lime, to convert sodium carbonate to sodium hydroxide, and the resulting solution, known as "white liquor" becomes available as fresh cooking liquor in the pulping operation. The steps of dehydration, carbonization, burning and fusion are carried out in a furnace which may take a variety of forms (see for example Power, vol. 83, No. 5, pages 80–81, May, 1939). The heat of combustion of the organic matter eliminated is usually sufficient to maintain the operation and to supply heat to produce steam. Losses in handling and in the several processing steps require the addition of make-up material to maintain the required concentrations of sodium hydroxide and sodium sulfide in the cooking liquor. In conventional practice these losses are made up by the addition of sodium sulfate to the black liquor in the furnace, the sodium sulfate thus being reduced to sodium sulfide in connection with carbonization and combustion of the dehydrated residue or black ash. It is this characteristic of the general operation which has caused it to be designated as the "sulfate process" although sodium sulfate as such plays no part in the cooking operation itself.

The conditions, particularly of temperature and draft, which prevail in the ordinary recovery furnace involve not only losses from the introduced black liquor but also losses from the introduced makeup sodium sulfate. Such losses of makeup sodium sulfate amount to as much as 100 pounds or more of sodium sulfate per ton of pulp produced. It will be apparent that such losses impose a serious burden upon the economy of the sulfate process. The improvements of this invention afford important advantages in this respect.

In carrying out this invention makeup of the sodium hydroxide—sodium sulfide content of the cooking liquor is effected by adding soda ash and sulfur to the molten salt mixture from the carbonizing and burning of the black ash, passing the resulting mixture through a charge of coke in the presence of sufficient air to maintain reducing conditions and dissolving the reduced mixture in water to form the green liquor. The soda ash and sulfur are with advantage added in the form of a mixture of soda ash and sulfur intimately aggregated by fusion as described in Patent No. 2,223,631 issued December 3, 1940 on an application of Robert B. MacMullin. The conventional furnace operation is carried out as usual except that the makeup material is not introduced into the recovery furnace. The losses incident to such introduction are thereby avoided. The makeup material, in the form of soda ash and sulfur, is then added to the molten salt mixture from the recovery furnace and the resulting mixture is subjected to reducing conditions in a small auxiliary furnace. The reduced scale of this auxiliary operation and the comparatively moderate conditions prevailing therein render negligible any losses incident to the auxiliary operation. The form of the auxiliary furnace is not important. For example it may be of the reverberatory type or of the cupola type. Sufficient air is supplied to the auxiliary furnace to keep the temperature high enough to effect reduction of any unreduced sulfur compounds in the total salt mixture. Soda ash and sulfur are added to the molten salt mixture from the recovery furnace in the proportions necessary to maintain the required concentrations of sodium hydroxide and sodium sulfide in the cooking liquor. These proportions will vary as the losses of soda and sulfur vary in the particular operation. If the sodium carbonate and sulfur are added by ratio of 106:32 (by weight) the addition of 138 pounds of this mixture will be equivalent to the addition of 142 pounds of sodium sulfate. Thus in any particular operation the ratio of mixed sodium carbonate and sulfur (mixed in a ratio of 106:32) to the sodium sulfate for which the mixture is to be substituted will be about 138:142 before allowing for the reduction in quantities required resulting from the improvement in economy attained through the invention. Where the losses of soda and sulfur vary from the ratio in which these two components are replaced by addition of sodium sulfate, the ratio of sodium carbonate to sulfur in the mixture added for makeup is correspondingly varied to balance the differences in such losses. The molten salt mixture from the auxiliary furnace is dissolved in water to form the green liquor which is then handled as in conventional practice.

In one way of carrying out this invention carbon in the form of coke or otherwise available for effecting the reduction may be added to the molten salt mixture from the carbonizing and burning of the black ash together with the soda ash and sulfur.

One form of apparatus appropriate for carrying out this invention is illustrated diagrammatically and conventionally in the accompanying drawing. The accompanying drawing illustrates in elevation and partly in section and with parts broken away the discharge port 1 of a conventional recovery furnace, an auxiliary furnace 2 and a dissolving tank 3. The auxiliary furnace 2 is charged with coke and this coke charge 4 is maintained by appropriate additions from time to time as required. The molten salt mixture from the conventional recovery furnace is discharged over this charge of coke and flows downwardly therethrough. Air is blown through the charge of coke through a number of ports opening into a bustle pipe 5 connected with a controlled fan 6. The soda ash and sulfur required for makeup are added to the stream of molten salt flowing through the discharge port 1 or are charged into the upper end of the auxiliary furnace 2 with this molten salt mixture. Sufficient air is blown through the charge of coke to maintain reducing conditions but is limited to avoid excessive temperature or excessive draft. Sulfur compounds other than sodium sulfide are reduced to sodium sulfide as the total salt mixture flows downwardly through the charge of coke in the auxiliary furnace. This reduced salt mixture is then discharged from the auxiliary furnace through port 7 into the dissolving tank 3 where it is dissolved in water to form the green liquor. The agitator 8 is provided to promote solution of the salt mixture and to maintain uniformity.

In another aspect the invention comprises the production of fused salt mixtures, produced by fusion of sodium carbonate and sulfur in a reducing furnace, of special advantage as a makeup material in the sulfate process. Sodium carbonate and sulfur can be fused together and the fusion mixture reduced in a furnace such as the auxiliary furnace just described to form a product varying in composition, for example, from about 90% sodium sulfide and 10% sodium carbonate to about 10% sodium sulfide and 90% sodium carbonate. Carbon may be supplied to this reducing furnace as one component of a mixture of soda ash, sulfur and carbon as previously described. This product can be either cast in blocks or granulated or dissolved in water to produce a solution of high concentration, 50% of available sodium compounds plus sodium sulfate, for example, which can then be added to the green liquor in an otherwise conventional operation as a substitute for the introduction of makeup material to the recovery furnace. The solidified fused product can be added as required to the green liquor formed by dissolving the molten salt mixture from the recovery furnace in water without involving the losses incident to the introduction of makeup material to the recovery furnace. The use of this fused product as a makeup material eliminates any need for furnace processing of makeup material in the sulfate process cycle. Because of its high content of sodium carbonate and sodium sulfide with respect to its weight, as compared either to sodium sulfate or to mixtures of sodium carbonate and sulfur, the use of this fused product offers further economies with respect to transportation costs.

The advantages of this invention with respect to economy of materials can be illustrated by example: Assume a conventional sulfate process operation in which the net requirement for makeup of the cooking liquor of sodium hydroxide and sodium sulfide approximates 150 pounds of sodium sulfate per ton of pulp produced. Due to losses involved in the conventional introduction of sodium sulfate into the recovery furnace, the actual requirement of sodium sulfate in this operation will approximate 250-300 pounds of sodium sulfate per ton of pulp produced. By means of this invention the makeup requirement using a mixture of soda ash and sulfur may be reduced to somewhat less than 150 pounds per ton of pulp produced and using the fused mixture of sodium carbonate and sodium sulfide previously described (containing for example 90% sodium sulfide) may be reduced to approximately 100 pounds per ton of pulp produced. It will thus be apparent that the invention affords important advantages with respect to economy of chemical materials used and with respect to economy in the amounts of chemical materials to be handled. The invention further affords improvements with respect to the quantity of heat recoverable from the recovery furnace in eliminating reduction of sodium sulfate as a burden on this furnace and also provides improved control of conditions generally within the process cycle, including the recovery furnace operation and the composition of the cooking liquor.

I claim:

1. In the regeneration of sodium hydroxide-sodium sulfide cooking liquors whereby the black ash recovered from the spent liquor is subjected to carbonizing and burning to produce a molten salt mixture consisting principally of sodium carbonate and sodium sulfide, the improvement which comprises adding soda ash and sulfur to the molten salt mixture, passing the resultant mixture in a fused state through a charge of coke in the presence of sufficient air to maintain reducing conditions, whereby the sulfur is converted to sodium sulfide, and dissolving the reduced mixture in water to form green liquor.

2. In the regeneration of sodium hydroxide-sodium sulfide cooking liquors whereby the black ash recovered from the spent liquor is subjected to carbonizing and burning to produce a molten salt mixture consisting principally of sodium carbonate and sodium sulfide, the improvement which comprises adding a mixture of soda ash and sulfur intimately aggregated by fusion to the molten salt mixture, passing the resultant mixture in a fused state through a charge of coke in the presence of sufficient air to maintain reducing conditions, whereby the sulfur is converted to sodium sulfide, and dissolving the reduced mixture in water to form green liquor.

3. In the production of fused mixtures of sodium sulfide and sodium carbonate, the improvement which comprises adding soda ash and sulfur to a molten salt mixture resulting from the carbonizing and burning of black ash and passing the resultant mixture in a fused state through a charge of coke in the presence of sufficient air to maintain reducing conditions, the total amount of soda ash present being in excess of that required to react with the sulfur to form the sulfide.

4. In the production of fused mixtures of sodium sulfide and sodium carbonate, the improvement which comprises passing a mixture comprising soda ash and sulfur through a charge of hot coke in the presence of sufficient air to maintain reducing conditions and to maintain the temperature of the coke charge sufficiently high to fuse the soda ash-sulfur mixture, the amount of soda ash being in excess of that required to react with the sulfur to form the sulfide.

WALTER LEE SAVELL.